(12) United States Patent
Yamaji et al.

(10) Patent No.: US 8,903,200 B2
(45) Date of Patent: Dec. 2, 2014

(54) IMAGE PROCESSING DEVICE, IMAGE PROCESSING METHOD, AND IMAGE PROCESSING PROGRAM

(75) Inventors: Kei Yamaji, Tokyo (JP); Tetsuya Matsumoto, Tokyo (JP); Kazuma Tsukagoshi, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 182 days.

(21) Appl. No.: 13/532,020

(22) Filed: Jun. 25, 2012

(65) Prior Publication Data
US 2013/0004073 A1    Jan. 3, 2013

(30) Foreign Application Priority Data

Jun. 28, 2011 (JP) ................................ 2011-143005

(51) Int. Cl.
| G06K 9/03 | (2006.01) |
| G06K 9/34 | (2006.01) |
| G06F 17/00 | (2006.01) |
| H04N 1/00 | (2006.01) |
| H04N 1/387 | (2006.01) |
| G06T 11/60 | (2006.01) |

(52) U.S. Cl.
CPC ........... *H04N 1/387* (2013.01); *H04N 1/00196* (2013.01); *H04N 1/00161* (2013.01); *G06T 11/60* (2013.01)
USPC ............................. 382/309; 382/173; 715/255

(58) Field of Classification Search
CPC ............... G06F 17/24; H04N 1/00161; H04N 1/00196; H04N 1/387
USPC .................. 382/173, 305, 309, 312; 345/419; 715/253, 255
See application file for complete search history.

(56) References Cited

U.S. PATENT DOCUMENTS

| 5,796,428 | A | 8/1998 | Matsumoto et al. |
| 6,721,451 | B1 * | 4/2004 | Ishitani ........................ 382/181 |
| 8,331,736 | B2 * | 12/2012 | Nakanishi et al. ............ 382/305 |
| 2004/0233299 | A1 | 11/2004 | Ioffe et al. |
| 2008/0080749 | A1 | 4/2008 | Nonaka et al. |
| 2012/0027293 | A1 * | 2/2012 | Cok .............................. 382/164 |

FOREIGN PATENT DOCUMENTS

| JP | 11-175533 | 7/1999 |
| JP | 2001-043345 | 2/2001 |
| JP | 3528214 | 5/2004 |
| JP | 2004-180114 | 6/2004 |
| JP | 2004-295236 | 10/2004 |

(Continued)

OTHER PUBLICATIONS

Chinese Official Action—201210222313.2—Jun. 5, 2014.

*Primary Examiner* — Kanjibhai Patel
(74) *Attorney, Agent, or Firm* — Young & Thompson

(57) ABSTRACT

The image processing device divides images into groups, generates image analysis information of the images, extracts a predetermined number of images from each group based on the image analysis information and arranges the images extracted from each group on a corresponding page of a photo book. The image display section displays an image editing area for displaying images arranged on a page to be edited and a candidate image display area for displaying candidate images included in a group corresponding to the page to be edited and being usable for editing the image, and the image editing section uses the candidate images displayed in the candidate image display area to edit the image layout on the page to be edited based on the user's instruction.

21 Claims, 12 Drawing Sheets

(56) References Cited

FOREIGN PATENT DOCUMENTS

| JP | 2004-348733 | 12/2004 |
| JP | 2006-229682 | 8/2006 |
| JP | 2008-084047 | 4/2008 |
| JP | 2009-223764 | 10/2009 |
| JP | 4438061 | 3/2010 |

* cited by examiner

IN ORDER OF SHOOTING TIME

IMAGE PROCESSING DEVICE, IMAGE PROCESSING METHOD, AND IMAGE PROCESSING PROGRAM

BACKGROUND OF THE INVENTION

The present invention relates to an image processing device, an image processing method and an image processing program for editing the image layout on each page of a photo-content commodity such as a photo book composed of a plurality of pages.

The photo book is a service with which a user (photographer) transmits a plurality of images (image data) captured by, for example, a digital camera to a service provider through the Internet to create a photo album having a layout desired by the user. When creating a photo book, the user can select a desired template from a plurality of layout templates in which positions where images can be arranged are previously determined and determine as desired the number of pages of the photo book, images to be included in each page, and the layout of the images in each page.

A conventionally known photo book-creating method involves classifying images into groups in consideration of the continuity and relationship of the images, for example, based on the shooting time and automatically arranging (laying out) images included in each of the groups on their corresponding pages.

For example, JP 2009-223764 A describes an automatic album layout method which comprises classifying acquired images and selection images selected by a user from among the acquired images based on attributes such as subject, shooting time and shooting scene, making indices indicating the degree of importance of the selected images for each of the attributes based on the comparative results between the number of the acquired images and the number of the selected images, providing the indices to the selected images, and arranging and combining the images in the allocated regions of an album template.

JP 11-175533 A describes an image retrieval device which reads information containing a plurality of pieces of image information, automatically preparing retrieval information such as GPS information, date and time information and retrieval keyword (athletic meet) for each piece of the image information based on the read information, records the image information and the retrieval information in association with each other, compares an input retrieval condition with the retrieval information, extracts image information corresponding to the retrieval condition by retrieval and displays an image represented by the extracted image information on the screen.

JP 3528214 B proposes an image display method comprising setting classifying conditions for each page based on accessory information data concerning capture of image data and attached to the image data upon the capture thereof, classifying the image data for each page based on the accessory information data and the conditions, and displaying the classified image data on a display screen for each page.

JP 4438061 B describes a method of controlling an electronic album editing device which comprises retrieving similar image data from a plurality of pieces of image data, and displaying one of the similar image data in the editing area corresponding to a page of an electronic album as representative similar image data, the other similar image data in the evacuation area independent from the page of the electronic album, and similar image data associated with the specified representative similar image data in such a manner that such similar image data may be distinguished from other image data displayed in the evacuation area.

SUMMARY OF THE INVENTION

An image processing device which involves automatically selecting a predetermined number of images from a plurality of images and arranging them on a corresponding page of a photo book is conventionally known. However, even if automatic image selection and automatic layout are performed in a sophisticated manner, it is difficult to perfectly understand the user's thinking (preference) and reflect it in the image layout. Therefore, it is essential for the user to perform an image layout editing operation based on the automatic layout.

An object of the present invention are to provide an image processing device, an image processing method and an image processing program with which a user can easily perform an image layout editing operation on each page of a photo-content commodity after images are automatically arranged thereon.

In order to achieve the above object, the present invention provides an image processing device for editing an image layout on each page of a photo-content commodity composed of a plurality of pages, the image processing device comprising:

an image dividing section for dividing a plurality of images into a predetermined number of groups based on accessory information of the plurality of images;

an image analyzing section for analyzing each of the plurality of images to generate image analysis information thereof;

an image extracting section for extracting, for each group, a predetermined number of images from images included in each of the predetermined number of groups based on the image analysis information;

an image arranging section for arranging, for each group, the predetermined number of images extracted by the image extracting section from each of the predetermined number of groups on a page corresponding to each of the predetermined number of groups;

an image display section for displaying the page on which the predetermined number of images are arranged by the image arranging section; and an image editing section for editing, based on an instruction from a user, the image layout on the page on which the predetermined number of images are arranged by the image arranging section, wherein the image display section is adapted to display, in a display screen, an image editing area for displaying images arranged on a first page to be edited as specified by the user and a candidate image display area for displaying candidate images which are included in a first group corresponding to the first page and which are usable for editing the image layout by the image editing section, and wherein the image editing section is adapted to use the candidate images displayed in the candidate image display area to edit the image layout on the first page displayed in the image editing area based on the instruction from the user.

The present invention also provides an image processing method for editing an image layout on each page of a photo-content commodity composed of a plurality of pages, the image processing method comprising:

an image dividing step of dividing a plurality of images into a predetermined number of groups based on accessory information of the plurality of images;

an image analyzing step of analyzing each of the plurality of images to generate image analysis information thereof;

an image extracting step of extracting, for each group, a predetermined number of images from images included in each of the predetermined number of groups based on the image analysis information;

image arranging step of arranging, for each group, the predetermined number of images extracted by the image extracting step from each of the predetermined number of groups on a page corresponding to each of the predetermined number of groups;

an image display step of displaying the page on which the predetermined number of images are arranged by the image arranging step; and an image editing step of editing, based on an instruction from a user, the image layout on the page on which the predetermined number of images are arranged by the image arranging step, wherein the image display step displays, in a display screen, an image editing area for displaying images arranged on a first page to be edited as specified by the user and a candidate image display area for displaying candidate images which are included in a first group corresponding to the first page and which are usable for editing the image layout in the image editing step, and wherein the image editing step uses the candidate images displayed in the candidate image display area to edit the image layout on the first page displayed in the image editing area based on the instruction from the user.

The present invention also provides a computer readable recording medium having recorded thereon a program for causing a computer to execute each step of the image processing method according to above.

According to the invention, of the images included in the group corresponding to the page to be edited, only the remaining images which were not extracted by the image extracting section are displayed in the candidate image display area as the candidate images for the editing operation, or all images included in the group are displayed in the candidate image display area as the candidate images for editing operations in such a manner that images arranged on the page to be edited can be distinguished from images not arranged on the page to be edited, whereby the user can easily perform the editing operations including the selection, addition and replacement of images without the need to consider whether the image of interest is a candidate image usable for editing the image layout on the page to be edited.

DETAILED DESCRIPTION OF THE INVENTION

The image processing device, image processing method and image processing program of the invention are described below in detail with reference to preferred embodiments shown in the accompanying drawings.

Figure 1:
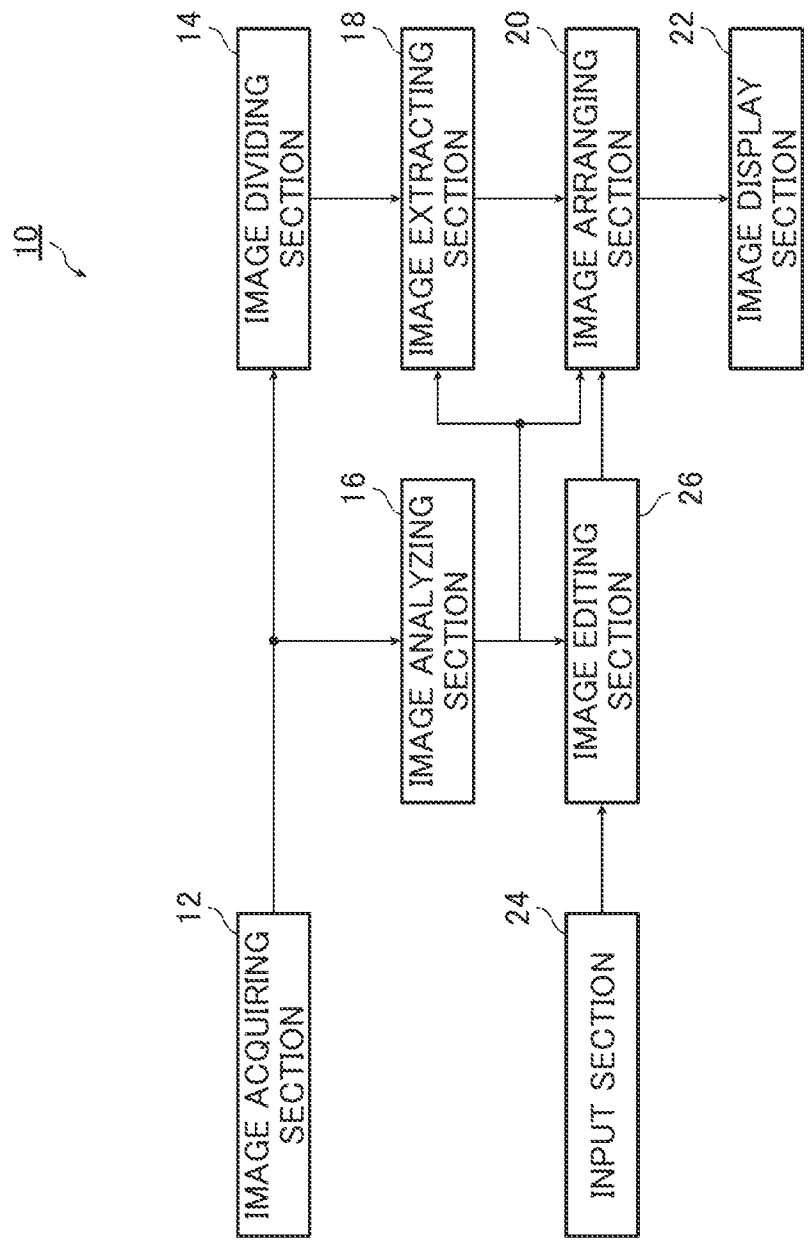
FIG. 1 is a block diagram illustrating the configuration of an embodiment of an image processing device of the invention.

FIG. 1 is a block diagram illustrating the configuration of an embodiment of the image processing device of the invention. The image processing device 10 shown in FIG. 1 automatically arranges images on each page of a photo book and then edits the layout of the images on each page. The image processing device 10 includes an image acquiring section 12, an image dividing section 14, an image analyzing section 16, an image extracting section 18, an image arranging section 20, an image display section 22, an input section 24 and an image editing section 26.

The image acquiring section 12 acquires a plurality of images (image data) which can be used in a photo book (be arranged on each page of the photo book). The image acquiring section 12 acquires such images through, for example, a USB (universal serial bus) memory, a memory card, an optical disk, or a wired/wireless network. Although not shown, the images acquired in the image acquiring section 12 are stored, for example, in a storage device such as a hard disk.

The image dividing section 14 divides the plurality of images acquired in the image acquiring section 12 into a predetermined number of groups based on image accessory information.

The image accessory information as used herein refers to various kinds of information including information acquired by a photographic device upon image capture such as shooting time and shooting position. If accessory information is associated with its corresponding image, the accessory information and the image may be provided as separate files but if an image captured by, for example, a digital camera is recorded in an image file format such as Exif (Exchangeable Image File Format), these various kinds of information are attached to the captured image data and recorded as header information (Exif information) thereof.

Subsequently, the image analyzing section 16 analyzes predetermined analysis items for each image acquired in the image acquiring section 12 and determines the image evaluation value based on at least one of the analysis results of the analysis items.

The image evaluation value as used herein is used as a reference index for extracting an image which is very useful to users. There is no limitation on the image analysis item, image analyzing method, image evaluation method and evaluation value-determining method. However, as described in, for example, JP 2006-229682 A and JP 2008-84047 A, an exemplary analysis item includes analyzing whether an image includes a person's face. If an image includes a person's face, it is possible to detect the face region from the image and rate each image by numbers, for example, on a scale of 0 to 10 or quality flags such as good, fair and poor based on the size, the position, the orientation, the skin color and the expression of the face, the number of persons included in the image, and the positional relationship between the persons. If the image does not include a person's face, the image evaluation value may be determined based on, for example, the lightness and hue of the image and the degree of blurring. The evaluation value may be determined based on, for example, the accessory information such as the shooting time, shooting position, photographer and photographic device (camera) and the user's instruction, or by weighting the analysis results of the analysis items.

Whether or not an image includes a person's face can be determined by, for example, a face detection process using a DWT coefficient obtained by wavelet transformation of the image as described in H. Schneiderman et al., "A statistical method for 3d object detection applied to faces and cars," (IEEE Conf. on Computer Vision and Pattern Recognition, 2000, pp. 746-51) which is cited in JP 2004-348733 A.

The size of the face can be determined using, for example, the number of pixels within the face region, the ratio of the face region to the whole image or the ratio of the face region to the image width.

The position of the face can be determined using the ratio (in terms of percentage) of the coordinate values at the central position of the face region (e.g., at the point of intersection between the diagonal lines when the face region is rectangular) to the horizontal length and the vertical length of the image.

The orientation of the face can be determined using, for example, information indicating that the face included in the face region is oriented to the front or laterally. It is also possible to further perform eye detection in the face region and determine that the face is oriented to the front when two eyes are detected and laterally when one eye is detected.

Alternatively, whether or not the face is oriented to the front or laterally may be determined using characteristic amount which represents the orientation of the face and which is calculated from the face region.

The skin color of the face is determined by detecting the face from the image according to the process described in JP 2004-348733 A, judging whether or not the color of the detected face exceeds the predetermined reference value of the suitable skin color set in the color space according to the process described in JP 2004-180114 A and judging the image in which the color of the detected face exceeds the reference value as an image including a suitable skin color.

As for the expression, whether or not the face included in the image is smiling is determined according to the process described in JP 2001-43345 A. More specifically, in facial images having various expressions, characteristic vectors for identifying the expressions are previously stored based on the motion patterns of skin, a characteristic vector is calculated from an image of interest, the distance between this characteristic vector and the previously stored characteristic vectors is calculated and the expression corresponding to the characteristic vector having the shortest distance with the characteristic vector of interest is determined as the facial expression included in the image of interest.

The positional relationship between persons can be determined from the angle formed between the image horizontal line and a line connecting the center of the face of a person to be evaluated out of faces of the persons, with the center of the face of another person.

As for the image lightness, for example, the average in all the pixels is calculated for all the images, whether or not the average exceeds a predetermined threshold Th1 is judged, and an image in which the average exceeds the threshold Th1 is determined as an image having lightness which satisfies a given condition.

As for the image blurring, for example, a process which involves decomposing an image into a high frequency component, a medium frequency component and a low frequency component and determining the degree of blurring based on the gain of the high frequency component as described in JP 2004-295236 A may be used. For example, whether or not the gain of the high frequency component exceeds a threshold Th2 is judged and an image having a gain exceeding the threshold Th2 is determined as an unblurred image.

Subsequently, the image extracting section 18 extracts a predetermined number of images (recommended images) from images included in a group, for example, in order of decreasing evaluation value, based on the evaluation values of the images determined in the image analyzing section 16, for each of the groups into which the images were divided in the image dividing section 14.

The image arranging section 20 arranges or automatically lays out, for each of the groups, the images extracted from the groups in the image extracting section 18 on the pages corresponding to the groups from which the images were extracted. The images extracted from one group are arranged on, for example, one page or double pages. The image arranging section 20 may arrange images based on the evaluation value or the shooting time upon arrangement of the images on a page of a photo book.

The image display section 22 displays each page where the images were arranged by the image arranging section 20. As will be described later, the image display section 22 displays the editing screen enabling the user to edit the image layout on each page of the photo book.

The input section 24 is used for the user to input various instructions including specifying (selecting) a page to be edited, specifying (selecting) a template to be used in each page, specifying (selecting) a candidate image, specifying an image to be edited and specifying image editing. The input section 24 can use input means such as a mouse, a keyboard and a touch panel to operate the screen displayed on the image display section 22 thereby inputting the instructions.

The image editing section 26 edits the image layout on the page having images arranged by the image arranging section 20 based on the user's instruction.

Next, the operation of the image processing device 10 is described according to the image processing method of the invention.

Figure 2:
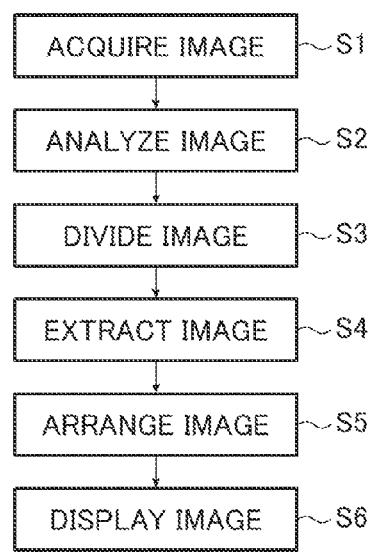
FIG. 2 is a flowchart illustrating an example of the operation of the image processing device.

The operation of the image processing device in cases where images are automatically arranged on each page of a photo book is first described with reference to the flowchart shown in FIG. 2.

In the image processing device 10, first of all, the image acquiring section 12 acquires a plurality of images that can be arranged on each page of the photo book (Step S1).

After the completion of the acquisition of the images in the image acquiring section 12, the image analyzing section 16 analyzes each of the images and determines the evaluation value thereof (Step S2).

Subsequently, the image dividing section 14 divides the acquired plurality of images into a predetermined number of groups based on accessory information of each of the images (Step S3).

Figure 3:
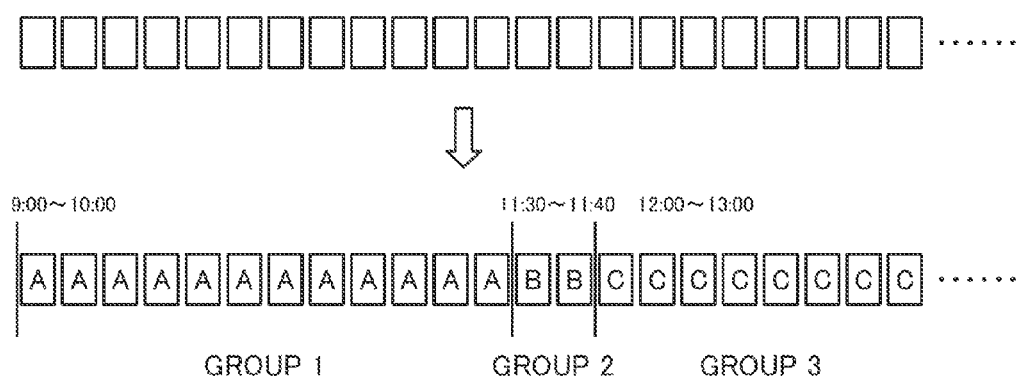
FIG. 3 is a conceptual diagram illustrating an example as to how a plurality of images are divided into a predetermined number of groups based on accessory information of the images.

When the shooting time is used as accessory information, the image dividing section 14 divides the acquired plurality of images into image groups having comparatively large shooting intervals therebetween. In the example shown in FIG. 3, the plurality of images are divided into shooting time groups of 9:00-10:00, 11:30-11:40, 12:00-13:00 and the like based on the shooting time in the accessory information. Group 1 contains twelve images, group 2 two images, group 3 eight images and so on. When the shooting position is used as accessory information, the plurality of images are divided into groups differing in shooting position.

Figure 4:
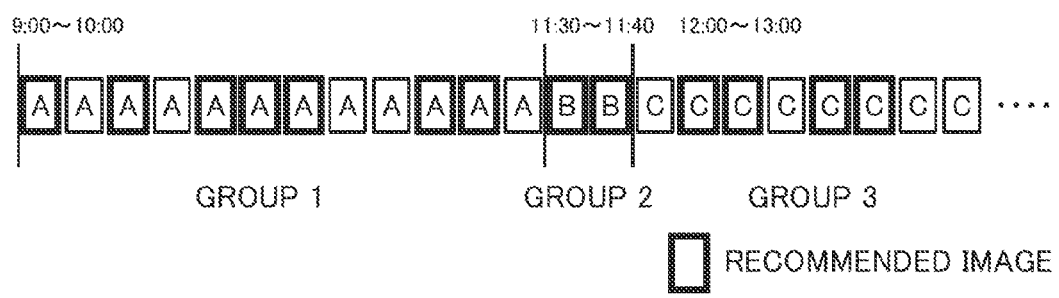
FIG. 4 is a conceptual diagram illustrating an example as to how a predetermined number of images are extracted for each group from images included in each group based on the evaluation values of the images.

Subsequently, the image extracting section 18 extracts a predetermined number of images (recommended images) from images included in a group based on the evaluation values of the images determined by the image analyzing section 16, for each of the groups into which the images were divided by the image dividing section 14 (Step S4). In the example shown in FIG. 4, seven images, two images and four images are extracted as recommended images from twelve images (A) in group 1, two images (B) in group 2 and eight images (C) in group 3, respectively.

Figure 5:
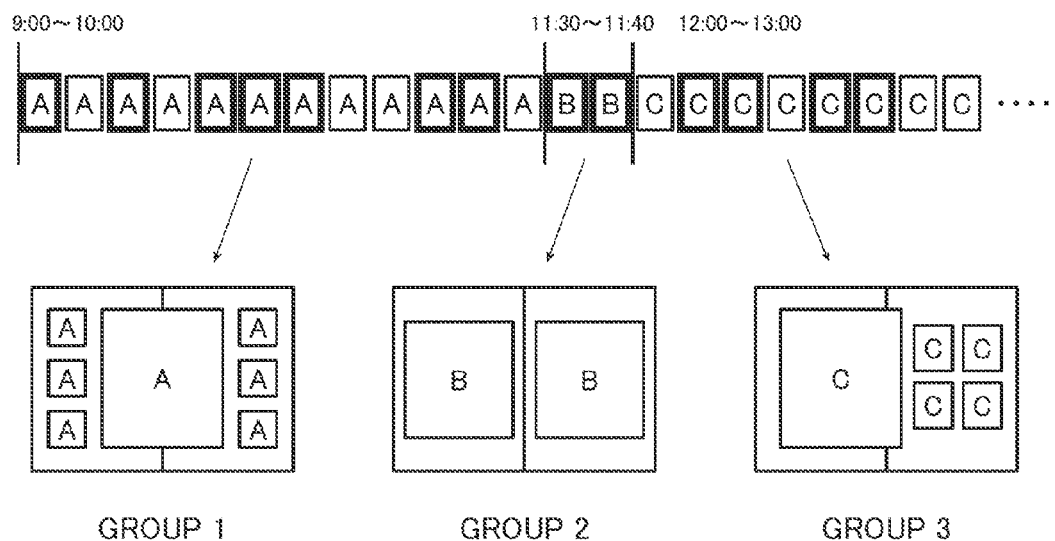
FIG. 5 is a conceptual diagram illustrating an example as to how images extracted from a group are arranged for each group on the corresponding page of a photo book.

Subsequently, the image arranging section 20 arranges or automatically laying out, for each group, the images extracted from the group by the image extracting section 18 on the corresponding page of the photo book (Step S5). In the example shown in FIG. 5, the images extracted from each group are arranged on the double pages.

Subsequently, the image display section 22 displays the page on which the images extracted from the corresponding group are arranged (Step S6).

Subsequently, the operation in cases where the image layout is edited after the automatic image layout is performed is described.

After the image arranging section 20 arranges, for each group, the images extracted from the group on the corresponding page of the photo book, the image editing section 26 edits the image layout on each page based on the user's instruction inputted through the input section 24.

Figure 6:
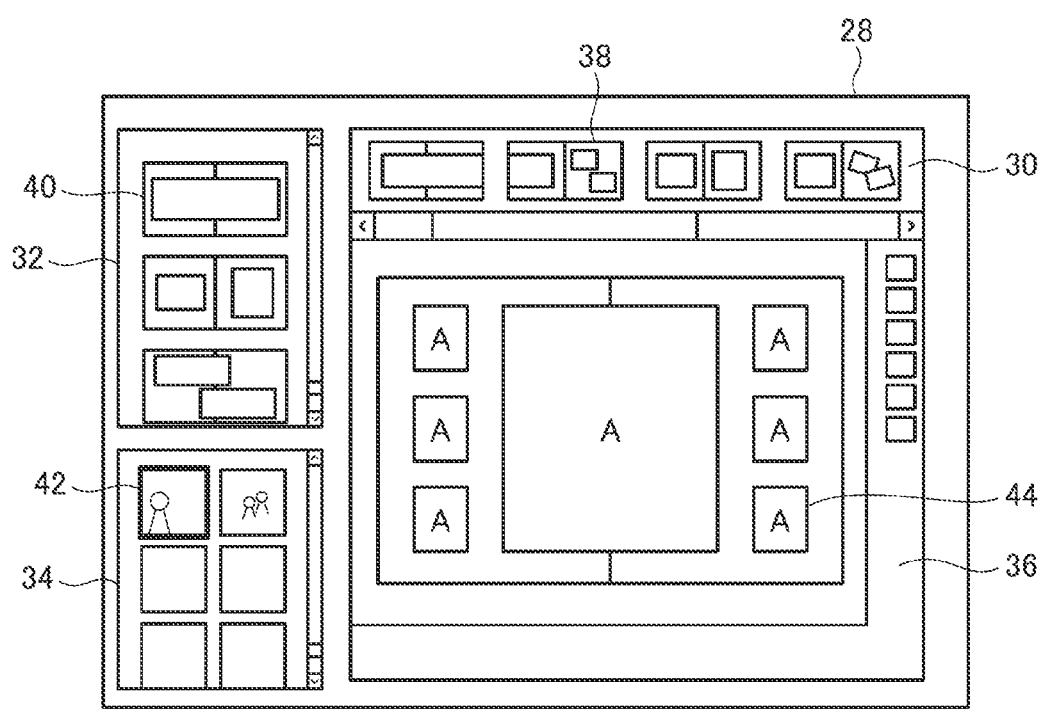
FIG. 6 is a conceptual diagram illustrating an example of a display screen of an image display section.

FIG. 6 is a conceptual diagram illustrating an example of the display screen of the image display section 22. The display screen of the image display section 22 shown in FIG. 6 illustrates an editing screen 28 in cases where the image layout editing operation is performed on each page of the photo book. FIG. 6 shows double pages corresponding to group 1 shown in FIG. 5. The page editing screen 28 includes a page specifying area 30, a template specifying area 32, a candidate image display area 34 and an image editing area 36.

The page specifying area 30 is an area where a list of pages 38 to be edited which are specified (selected) by the user through the input section 24 is displayed in reduced size, and is provided in the upper part of the right side region accounting for about two thirds of the editing screen 28. A predetermined number of pages 38 are only displayed on the editing screen 28 but the range of the predetermined number of pages 38 displayed on the editing screen 28 can be changed by the scroll bar.

The template specifying area 32 is an area where a list of templates 40 usable on the pages to be edited and specified (selected) by the user through the input section 24 is displayed in reduced size, and is provided in approximately the upper half of the left side of the display screen 28. Likewise, a predetermined number of templates 40 are only displayed on the editing screen 28, but the range of the predetermined number of templates 40 displayed on the editing screen 28 can be changed by the scroll bar.

On the template specifying area 32 are displayed one or more templates 40 having image layout regions for arranging images whose number is equal to or less than the number of images included in the group corresponding to the page to be edited which is displayed in the image editing area 36. In other words, in the example shown in FIG. 6, group 1 corresponding to the page to be edited includes twelve images and therefore the template specifying area 32 displays the templates 40 having up to twelve image layout regions.

By displaying only the templates 40 usable on the page to be edited in the template specifying area 32, the user can easily select a desired template 40 without the need to consider whether the template is usable.

Subsequently, the candidate image display area 34 is an area where a list of candidate images 42 usable in the image layout editing operation and specified (selected) by the user through the input section 24 is displayed in reduced size, and is provided in approximately the lower half of the left side of the display screen 28. Likewise, a predetermined number of candidate images 42 are only displayed on the editing screen 28, but the range of the predetermined number of candidate images 42 displayed on the editing screen 28 can be changed by the scroll bar.

The candidate image 42 as used herein refers to an image which is included in the group corresponding to the page to be edited and which is not arranged on the page to be edited. In the example shown in FIG. 6, of twelve images (A) included in group 1 corresponding to the page to be edited, seven images extracted by the image extracting section 18 are arranged (displayed) in the image editing area 36 and the remaining five images which were not extracted by the image extracting section 18 are only arranged (displayed) in the candidate image display area 34.

Of the images included in the group corresponding to the page to be edited, only the remaining images which were not extracted by the image extracting section 18 are thus displayed in the candidate image display area 34 as the candidate images 42 for the editing operation, whereby the user can easily perform the editing operations including the selection, addition and replacement of images without the need to consider whether the image of interest is a candidate image usable for editing the image layout on the page to be edited.

Lastly, the image editing area 36 is an area where the page to be edited which is specified by the user on the page specifying area 30, that is, the images 44 arranged on the page are displayed, and is provided in the right side region accounting for about two thirds of the editing screen 28. As described above, of twelve images (A) included in group 1 corresponding to the page to be edited, seven images 44 extracted by the image extracting section 18 are displayed in FIG. 6.

Next, the operation in cases where the image layout on each page is edited is described.

The operation in cases where the page to be edited is changed is first described.

The page editing screen 28 as shown in FIG. 6 is displayed on the image display section 22.

Subsequently, the user uses input means such as a mouse to click on a desired page 38 to specify the page 38 from a list of pages 38 displayed in reduced size on the page specifying area 30 on the page editing screen 28. When the user specifies the desired page 38 from the list of pages 38, the specified page 38 is displayed in the image editing area 36 as the page to be edited.

When another page 38 is then specified in the same manner as above, the specified page 38 is displayed in the image editing area 36 as the page to be edited.

Figure 7:
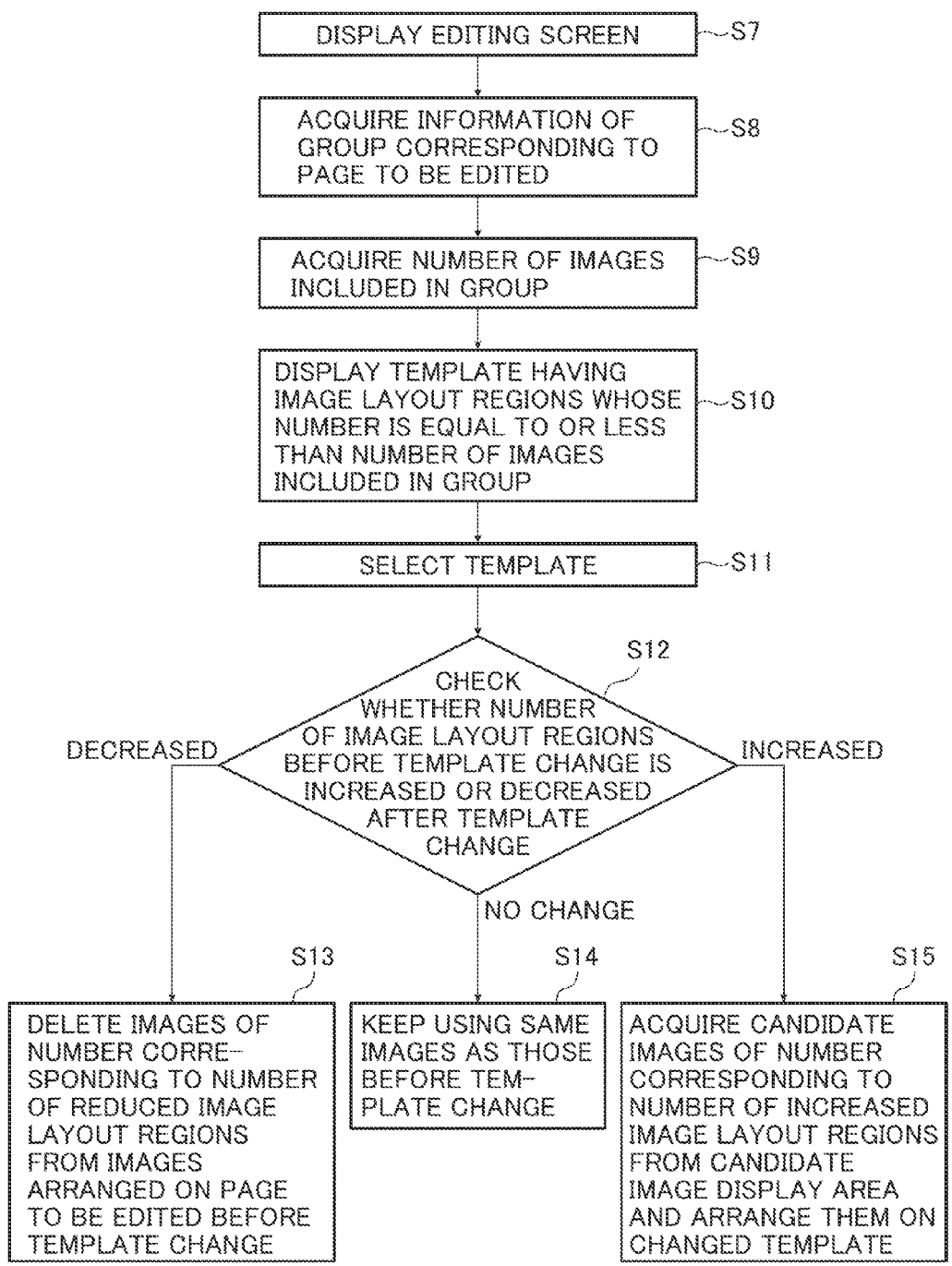
FIG. 7 is a flowchart illustrating an example of the operation upon change of a template.

Subsequently, the operation in cases where the template is changed is described with reference to the flowchart shown in FIG. 7.

The page editing screen 28 is likewise displayed on the image display section 22 (Step S7).

Subsequently, the image editing section 26 acquires information of the group corresponding to the page to be edited which is displayed in the image editing area 36 (Step S8) and acquires the number of images included in the group corresponding to the group information acquired in Step S8 (Step S9).

Subsequently, one or more templates 40 having image layout regions for arranging images whose number is equal to or less than the number of images included in the group acquired in step S9 are displayed in the template specifying area 32 (Step S10).

Subsequently, the user uses input means such as a mouse to specify a desired template 40 from among a list of templates 40 displayed in reduced size in the template specifying area 32 (Step S11).

Subsequently, whether the number of image layout regions of the template before the template is changed is increased or decreased after the template is changed in Step S11 is checked (Step S12).

As a result, in cases where the number of image layout regions is reduced after the template is changed, the image editing section 26 acquires (selects) images 44 of the number corresponding to the number of reduced image layout regions based on the image evaluation values from among the images 44 arranged on the page to be edited, in order of increasing evaluation value. The image arranging section 20 applies the changed template to the page to be edited, and arranges, in the image layout regions of the changed template, the remaining images after the images 44 acquired by the image editing section 26 are deleted from the images extracted from the group corresponding to the page to be edited (Step S13).

In cases where there is no change in the number of image layout regions after the template is changed, the image arranging section 20 applies the changed template to the page to be edited, and arranges, in the image layout regions of the changed template specified by the user, the images 44 arranged before the change on the page to be edited, that is, the images 44 extracted by the image extracting section 18 from the group corresponding to the page to be edited. In other words, the same images 44 as those before the template is changed are used (displayed) without any change (Step S14).

In cases where the number of image layout regions is increased after the template is changed, the image editing section 26 acquires (selects) candidate images 42 of the number corresponding to the number of increased image layout regions based on the image evaluation values from among the candidate images 42 included in the group corresponding to the page to be edited and displayed in the candidate image display area 34, in order of decreasing evaluation value. The image arranging section 20 applies the changed template to the page to be edited, and arranges, in the image layout regions of the changed template, the images extracted from the group corresponding to the page to be edited and the candidate images 42 acquired by the image editing section 26 (Step S15).

When the template is changed in the same manner as above, the changed template is applied to the page to be edited.

Figure 8:
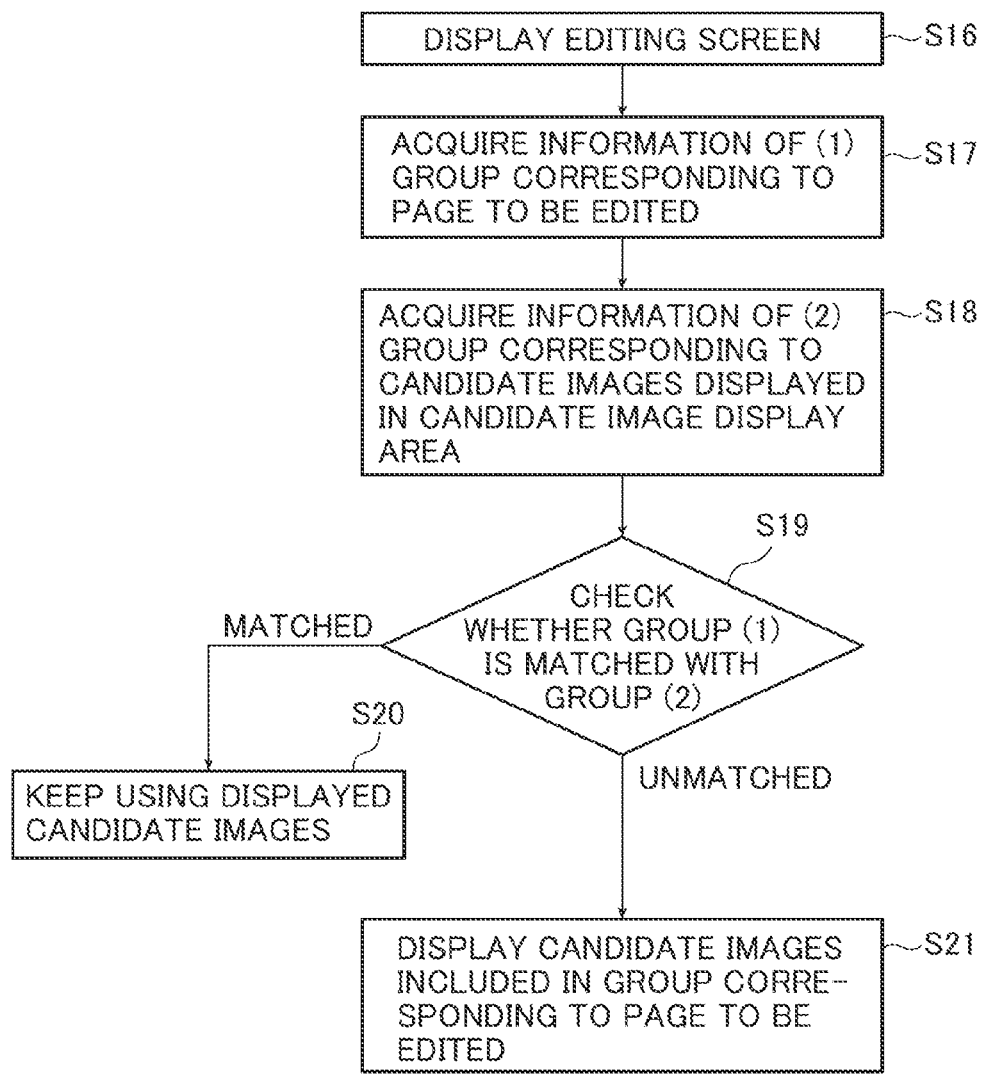
FIG. 8 is a flowchart illustrating an example of the operation upon change of a candidate image.

Subsequently, the operation in cases where the candidate images are changed is described with reference to the flowchart shown in FIG. 8.

The page editing screen 28 is likewise displayed on the image display section 22 (Step S16).

Subsequently, the image editing section 26 acquires information of (1) the group corresponding to the page to be edited which is displayed in the image editing area 36 (Step S17) and acquires information of (2) the group corresponding to the candidate images 42 displayed in the candidate image display area 34 (Step S18).

Subsequently, the image editing section 26 checks whether (1) the group corresponding to the page to be edited is matched with (2) the group corresponding to the candidate images 42 (Step S19).

As a result, the candidate images 42 displayed in the candidate image display area 34 are used (displayed) without any change when both the groups are matched with each other (Step S20).

On the other hand, when both the groups are not matched with each other, the candidate images 42 included in the group corresponding to the page to be edited are displayed in the candidate image display area 34 (Step S21).

The image display section 22 may display, in the candidate image display area 34, the candidate images 42 in all the groups, that is, all the candidate images 42 which are not arranged on the pages of the photo book, after the identification information representing the group including each candidate image 42 is attached thereto.

Figure 9:
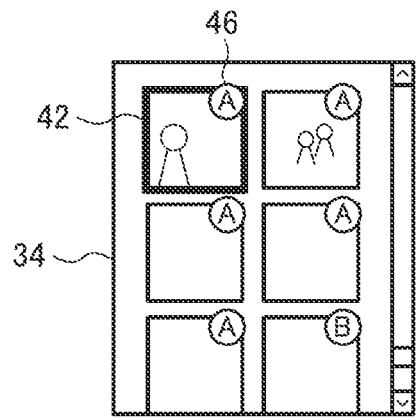
FIG. 9 is a conceptual diagram illustrating an example as to how group identification information is attached to each candidate image.

In this case, as shown in FIG. 9, the same identification information is attached to all the candidate images 42 included in the same group, the attached identification information is different from group to group and the candidate images 42 in all the groups are classified into the respective groups and displayed in the candidate image display area 34. The candidate images 42 included in the group corresponding to the page to be edited which is displayed in the image editing area 36 are displayed in the first part of the candidate image display area 34.

In the example shown in FIG. 9, a mark 46 is placed on each of the candidate images 42 displayed in the candidate image display area 34 as identification information. For example, a mark (A) is placed on five candidate images 42 included in group 1 and a mark (B) on two candidate images 42 included in the subsequent group 2. Based on the mark 46 placed on each candidate image 42, the user can easily identify what is the page to be edited corresponding to the group including the candidate image 42.

Figure 10:
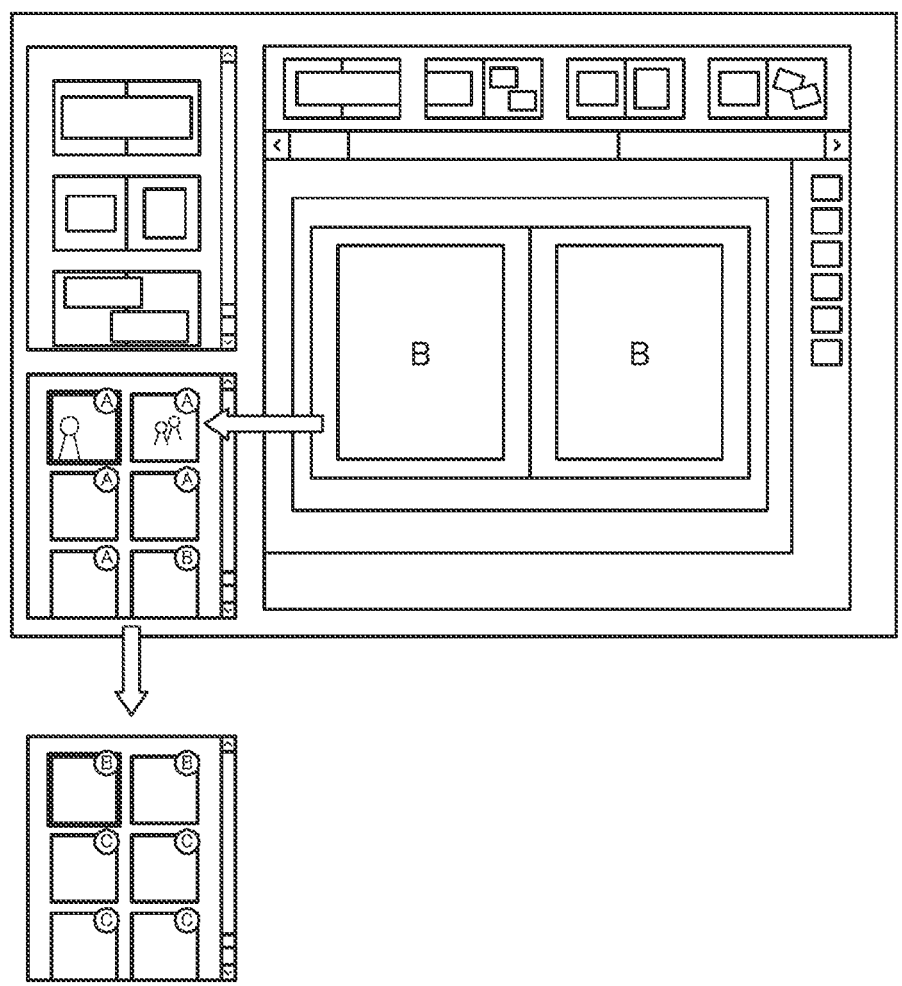
FIG. 10 is a conceptual diagram illustrating an example as to how candidate images included in a group corresponding to a page to be edited are shifted to the first part of a candidate image display area and displayed therein.

When the user changes the page to be edited, the candidate images 42 included in the group corresponding to the page to be edited after the change are shifted to the first part of the candidate image display area 34. As shown in FIG. 10, when the group corresponding to the page to be edited is changed from group 1 to group 2, the candidate images 42 included in group 2 are shifted to the first part of the candidate image display area 34 and displayed therein.

Figure 11:
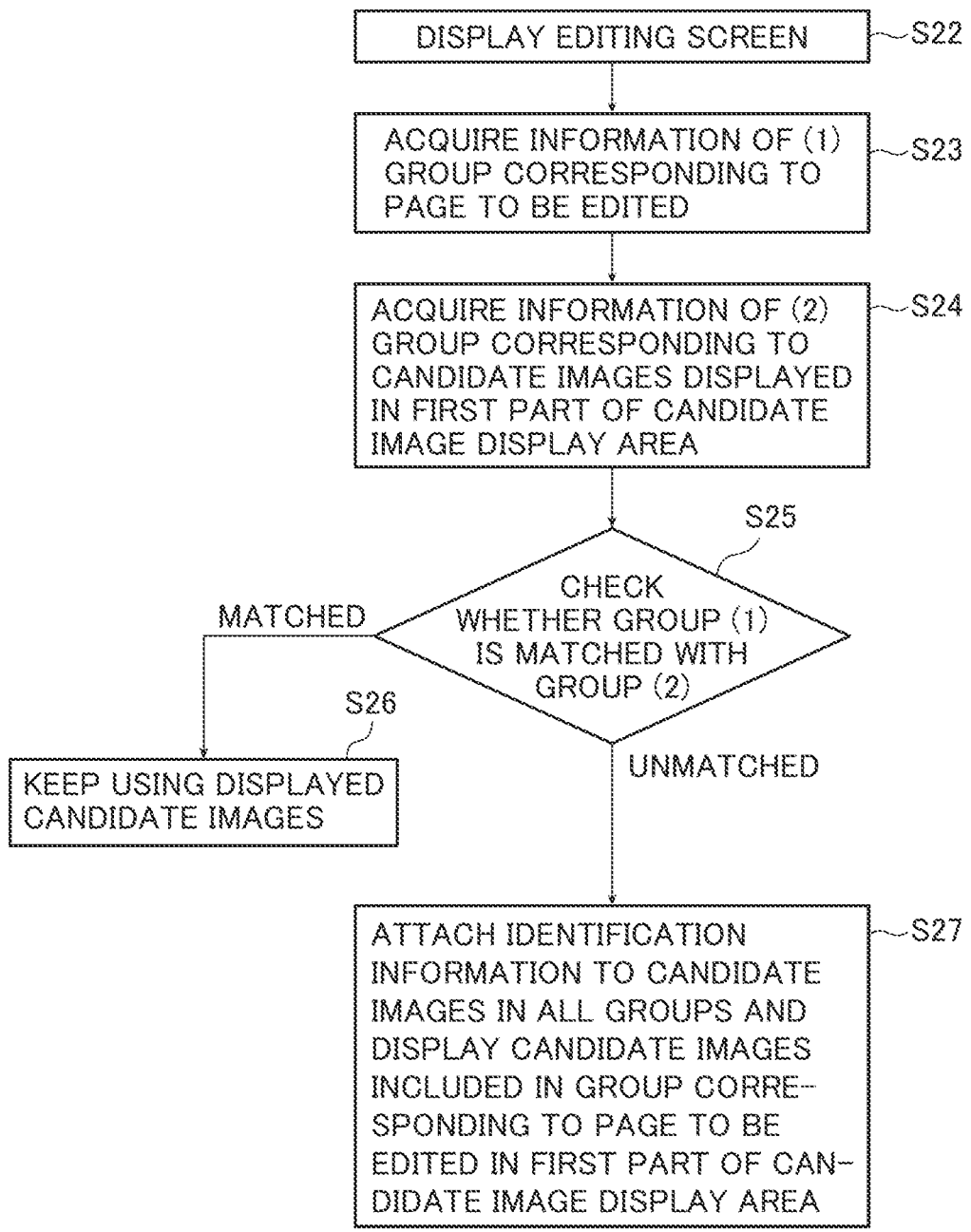
FIG. 11 is a flowchart illustrating another example of the operation upon change of a candidate image.

The operation in cases where the candidate images 42 in all the groups are displayed in the candidate image display area 34 is described below with reference to the flowchart shown in FIG. 11.

The page editing screen 28 is likewise displayed on the image display section 22 (Step S22).

Subsequently, the image editing section 26 acquires information of (1) the group corresponding to the page to be edited which is displayed in the image editing area 36 (Step S23) and acquires information of (2) the group corresponding to the candidate images 42 displayed in the first part of the candidate image display area 34 (Step S24).

Subsequently, the image editing section 26 checks whether (1) the group corresponding to the page to be edited is matched with (2) the group corresponding to the candidate images displayed in the first part (Step S25).

As a result, the candidate images displayed in the candidate image display area 34 are used (displayed) without any change when both the groups are matched with each other (Step S26).

On the other hand, when both the groups are not matched with each other, the group identification information is attached to the candidate images in all the groups and the candidate images included in the group corresponding to the page to be edited are shifted to the first part of the candidate image display area 34 and displayed therein (Step S27).

The candidate images included in the group corresponding to the page to be edited are always displayed in this way in the first part of the candidate image display area 34 and therefore the user can immediately identify the candidate images usable on the page to be edited.

It is not essential to place the mark 46 on each of the candidate images as identification information but the mark may be displayed so that the user can identify each candidate image group, for example, by changing the color of the mark 46 from group to group or changing the frame color of each candidate image.

Lastly, the operation in cases where the image layout of the page to be edited is edited is described.

The image editing section 26 uses the candidate images displayed on the candidate image display area 34 to edit the image layout on each page based on the user's instruction inputted though the input section 24.

The operation in cases where images are to be added to the page to be edited is first described.

A first embodiment of image addition is described below.

First of all, the image display section 22 displays a first image addition button in the image editing area 36 within the page editing screen 28. In the example shown in FIG. 12, the first image addition button 48 is located at the lower right position of the image editing area 36.

Subsequently, the user uses input means such as a mouse to press (click on) the first image addition button 48 displayed in the image editing area 36, whereupon the image editing section 26 acquires (selects), for example, one candidate image 42 having the highest evaluation value based on the evaluation value from among the candidate images 42 included in the group corresponding to the page to be edited. The image arranging section 20 adds (puts) the candidate image 42 acquired by the image editing section 26 to the page to be edited.

Figure 12:
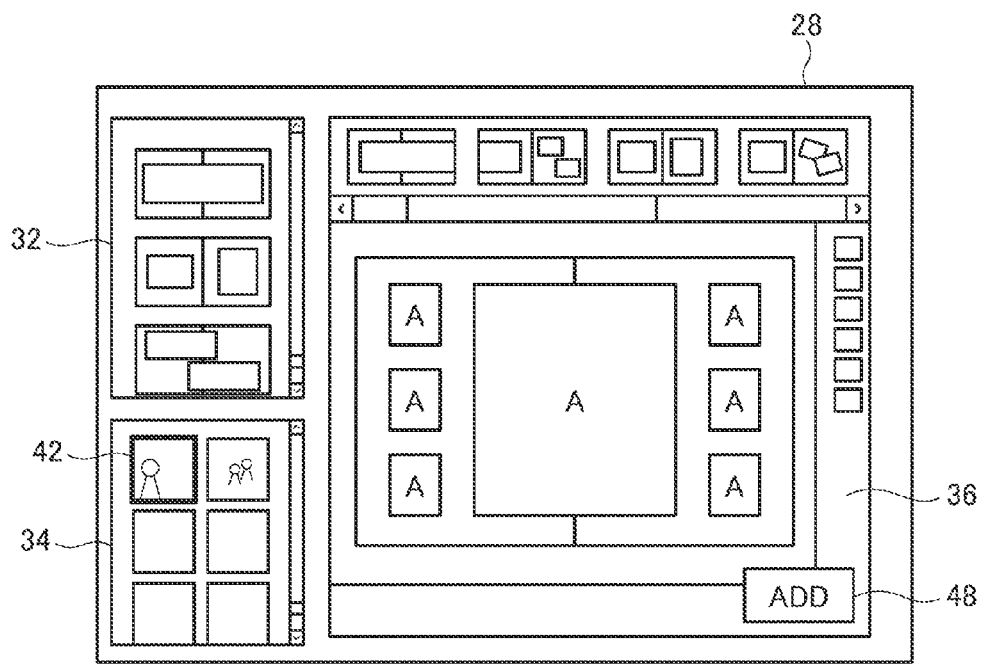
FIG. 12 is a conceptual diagram illustrating an example of an image editing area of a page editing screen on which an image addition button is displayed.

In the example shown in FIG. 12, the page corresponding to group 1 is displayed in the image editing area 36 and the candidate images included in group 1 are displayed in the candidate image display area 34. In this case, when the first image addition button 48 is pressed, one candidate image automatically selected based on the evaluation values from among candidate images included in group 1 corresponding to the page to be edited is added to the page to be edited which corresponds to group 1.

The automatically selected candidate image 42 is thus added to the page to be edited without selecting from the candidate images 42 displayed in the candidate image display area 34 and therefore the user can easily add the image to the page to be edited.

The image editing section 26 may acquire one candidate image based on not the evaluation value but the image shooting time, for example, a candidate image having the earliest shooting time.

Subsequently, a second embodiment of image addition is described below.

First of all, the image display section 22 displays a second image addition button in the candidate image display area 34 within the page editing screen 28. In the example shown in FIG. 13, the second image addition button 50 is located at the lower right position of the candidate image display area 34.

Subsequently, the user uses input means such as a mouse to select one or more candidate images 42 from among candidate images 42 displayed in the candidate image display area 34 and then presses the second image addition button 50, whereupon the one or more candidate images 42 selected by the user are acquired (selected) by the image editing section 26. The candidate images 42 acquired by the image editing section 26 are added (arranged) by the image arranging section 20 on the page corresponding to the group containing the candidate images 42 irrespective of the page to be edited which is displayed in the image editing area 36.

Figure 13:
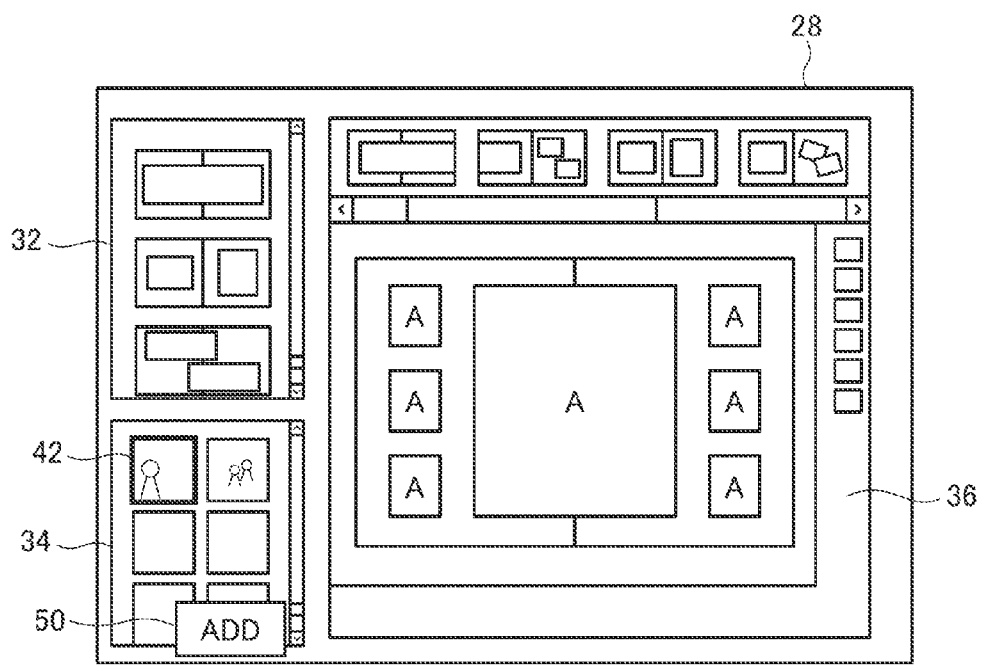
FIG. 13 is a conceptual diagram illustrating an example of a candidate image display area of the page editing screen on which the image addition button is displayed.

In the example shown in FIG. 13, the page corresponding to group 2 is displayed in the image editing area 36 and the candidate images included in group 1 are displayed in the candidate image display area 34. In this case, when the second image addition button 50 is pressed after the user selects one or more candidate images from among candidate images included in group 1, the one or more candidate images selected by the user are added not to the page corresponding to group 2 but to the page corresponding to group 1.

The candidate images selected by the user are added to the page corresponding to the group including the candidate images irrespective of the page displayed in the image editing area 36 and therefore the user can easily add desired candidate images to a desired page.

Subsequently, the operation in cases where an image on the page to be edited is replaced by a candidate image is described.

Figure 14:
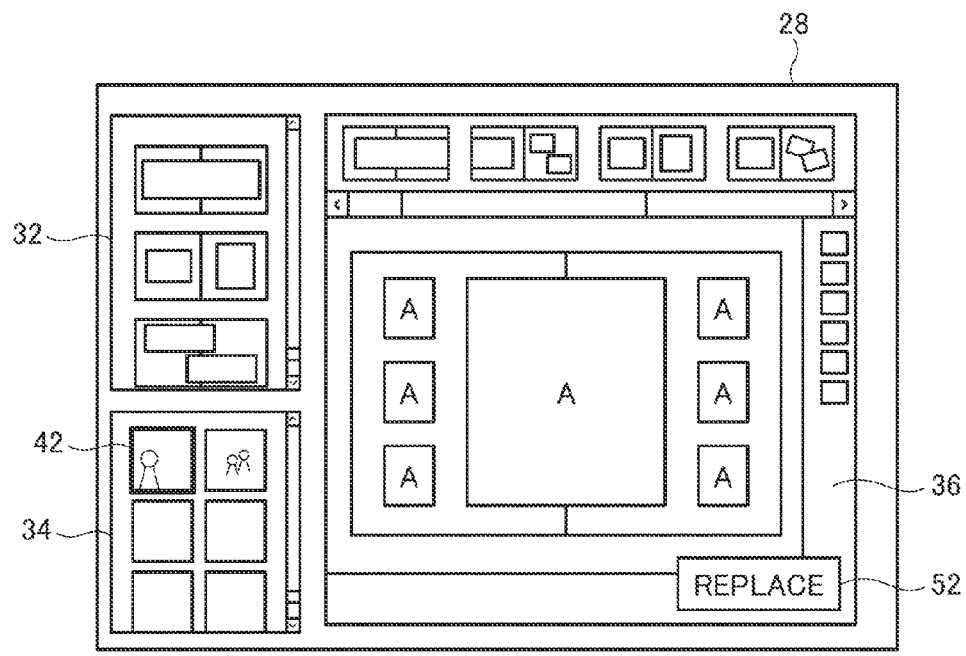
FIG. 14 is a conceptual diagram illustrating an example of the image editing area of the page editing screen on which an image replacement button is displayed.

First of all, the image display section 22 displays an image replacement button in the image editing area 36 within the page editing screen 28. In the example shown in FIG. 14, the image replacement button 52 is located at the lower right position of the image editing area 36.

Then, the user uses input means such as a mouse to select one or more images (images to be edited) from images displayed in the image editing area 36 and then presses the image replacement button 52, whereupon the image editing section 26 acquires (selects) based on the evaluation values one or more candidate images 42 whose number is the same as that of the images to be edited that were selected by the user, from the candidate images 42 included in the group corresponding to the page to be edited, for example, in order of decreasing evaluation value. Then, the image arranging section 20 replaces the one or more images to be edited that were selected by the user by the one or more candidate images 42 acquired by the image editing section 26.

The user can replace images without the need to select candidate images 42 for replacement by merely selecting images to be edited and pressing the image replacement button 52, and therefore the images can be very easily replaced by one another.

The image replacement is described below with reference to the case where twelve images included in group 1 are evaluated on a scale of 0 to 1000.

Figure 15:
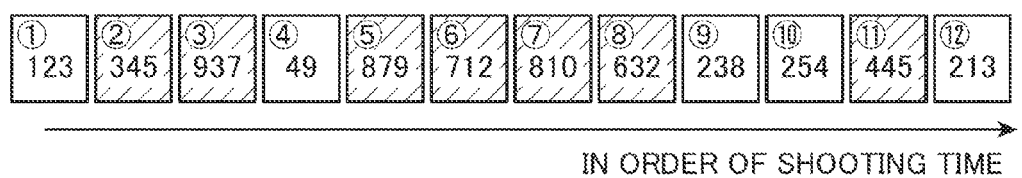
FIG. 15 is a conceptual diagram illustrating twelve images included in group 1 which have evaluation values determined on a scale of 0 to 1000.

As shown in FIG. 15, twelve images included in group 1 have evaluation values determined by the image analyzing section 16 on a scale of 0 to 1000. In FIG. 15, the twelve images are arranged from left to right in order of shooting time. The images have evaluation values of 123, 345, 937, 49, 879, 712, 810, 632, 238, 254, 445 and 213 from the image at the left end in FIG. 15 (from the image having the earliest shooting time).

Subsequently, the image extracting section 18 extracts seven images from the one having the highest evaluation value, that is, the second, third, fifth, sixth, seventh, eighth and eleventh images from the twelve images included in group 1 based on the image evaluation values.

Figure 16:
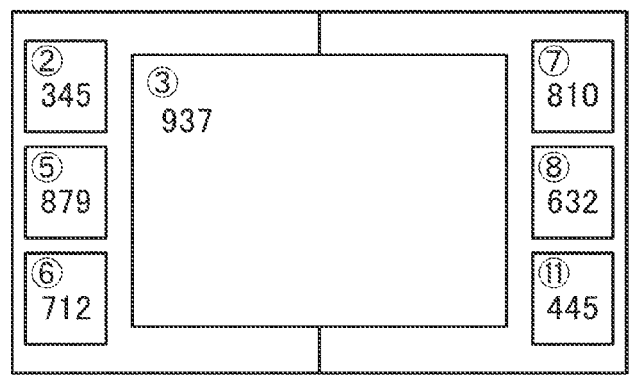
FIG. 16 is a conceptual diagram illustrating an example as to how seven images extracted from group 1 are arranged on the corresponding page of a photo book based on the evaluation values of the images.

Subsequently, the image arranging section 20 arranges the seven images extracted by the image extracting section 18 on the corresponding page of the photo book based on the image evaluation values and the shooting time. In the example shown in FIG. 16, of the seven images, the third image having the highest evaluation value is arranged in the central portion of the double pages in larger size, the second, fifth and sixth images are arranged in smaller size in order of shooting time from the upper side in the left side portion, and the seventh, eighth and eleventh images are arranged in smaller size in order of shooting time from the upper side in the right side portion.

Although not shown, of the twelve images included in group 1, the remaining five images which were not extracted by the image extracting section 18, that is, the first, fourth, ninth, tenth and twelfth images are displayed in the candidate image display area 34.

The operation in cases where the user selects in this state, for example, the sixth image (image to be edited) from the seven images displayed in the image editing area 36 and presses the image replacement button 52 is described.

Figure 17:
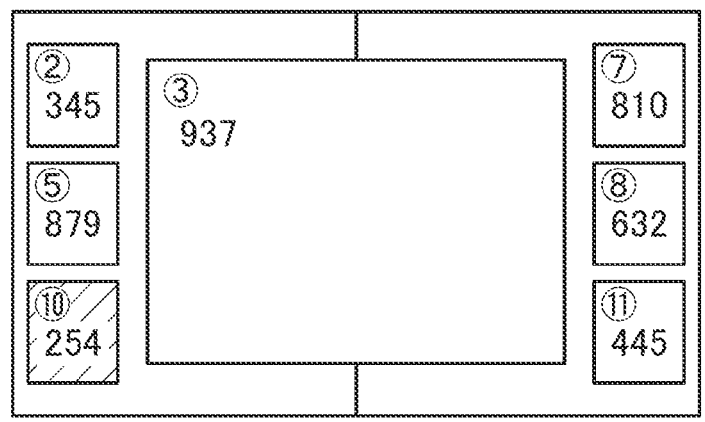
FIG. 17 is a conceptual diagram illustrating an example as to how an image is replaced.

In this case, as shown in FIG. 17, the image editing section 26 automatically selects the tenth image having the highest evaluation value from the five candidate images displayed in the candidate image display area 34 and replaces the sixth image by the tenth image. After the image replacement, the tenth image displayed in the image editing area 36 as a result of the replacement of the sixth image is made selectable.

Figure 18:
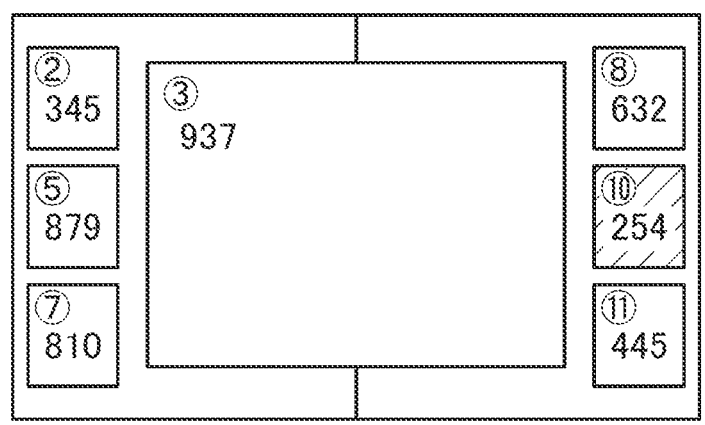
FIG. 18 is a conceptual diagram illustrating an example as to how the images after the replacement are rearranged in order of shooting time.

Since the six images arranged on the left and right sides of the third image having the highest evaluation value do not form a time series after the replacement of the sixth image by the tenth image, the six images after the image replacement are desirably rearranged in order of shooting time as shown in FIG. 18. In this way, as shown in FIG. 18, the second, fifth and seventh images are arranged in order of shooting time from the upper side in the left side portion of the third image arranged in the central portion of the double pages, and subsequently the eighth, tenth and eleventh images are arranged in order of shooting time from the upper side in the right side portion thereof.

Figure 19:
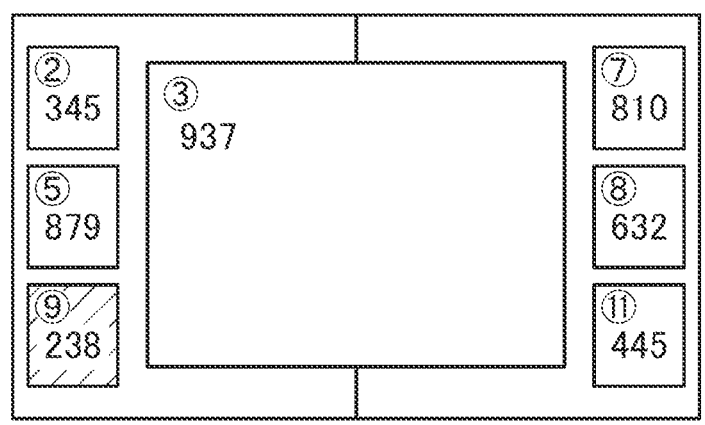
FIG. 19 is a conceptual diagram illustrating an example as to how the image replacement is performed again after an image replacement button is pressed again.

Subsequently, when the user presses the image replacement button again, the image editing section 26 automatically selects the ninth candidate image having the highest evaluation value next to the tenth image shown in FIG. 17 which is made selectable and replaces the tenth image by the ninth image as shown in FIG. 19. Also in cases where the six images after the image replacement are rearranged in order of shooting image as shown in FIG. 18, the tenth image which is made selectable is replaced by the ninth image.

Every time the user presses the image replacement button in the subsequent operation, the image replacement is performed in the same manner. The image replacement is finished at a point in time when the user stops pressing the image replacement button.

As described above, the user can easily perform, in the image processing device 10, the editing operations including specifying a page to be edited, specifying a template to be used on the page to be edited, adding images to each page and replacing images.

The image processing method of the invention can be realized as an image processing program for causing a computer to execute each step of the image processing method. The image processing method may be realized as a computer readable recording medium having the image processing program recorded thereon.

The present invention was used in a photo book in the above-described embodiment, but the present invention is not limited there to and may be similarly used in any photo-content commodity (including a tangible product such as a physical photo book and an intangible product such as data of a photo book processed on a computer) composed of a plurality of pages, e.g., a calendar composed of a predetermined number of pages or a shuffle print (template-synthesized print) composed of a predetermined number of pages on each of which a predetermined number of images are randomly shuffled and printed, in addition to a photo book (or photo album).

The photo-content commodity composed of a plurality of pages may be in a state where a plurality of pages are bound together like a photo book or may be a set of a plurality of pages (where the pages may be separately taken apart).

Moreover, the photo-content commodity according to the present invention includes a photo-content commodity and the like displayed on a display.

The image analyzing section determines an evaluation value of an image based on at least one of the analysis results of the analysis items in the above-described embodiment. However, the evaluation value is an example of image analysis information of the invention, and it is not essential that the image analyzing section determines an evaluation value as image analysis information.

The image analyzing section of the invention analyses each image to generate image analysis information thereof, and the image extracting section extracts a predetermined number of images from among images included in each group based on the image analysis information.

The image analysis information may be, for example, analysis results themselves of the analysis items of each image including face detection, determination of a similar image, and determination of blurring or may be an image evaluation value generated based on at least one of the analysis results of the analysis items of each image.

The image display section displays, in the candidate image display area, only images that are included in the group corresponding to the page to be edited but not arranged on the page to be edited, that is, the images to be used for editing the image layout by the image editing section in the above-described embodiment, but the invention is not limited thereto.

For example, the image display section may display, in the candidate image display are, all images included in the group corresponding to the page to be edited in such a manner that the images which are not arranged on the page to be edited are attached with identification information to be distinguished from those not arranged on the page to be edited.

By displaying images in such a manner that the images arranged on the page to be edited can be distinguished from those not arranged on the page to be edited as described above, the user may instantly identify the candidate images that may be used for editing the image layout on the page to be edited and easily make editing operations such as selection, addition and replacement of images.

In addition, the image display section preferably displays the image analysis information in the candidate image display area for a support when the user selects from the candidate images. In this case, the image display section displays, for example, evaluation values, the result of face detection (by surrounding a face with a circle, for example) and the result of blurring determination (by adding a mark on a blurring image, for example) of the candidate images.

By displaying the image analysis information in the candidate image display area in this way, the user may select the most suitable candidate image in view of the image analysis information.

In addition, if the user is not satisfied with the resulting layout, an automatic rearrangement (relayout) using a different template is preferably performed upon an instruction for rearrangement from the user.

In this case, based on the instruction for rearrangement from the user, the image editing section automatically selects a different template from the one used on the page to be edited displayed in the image display section from among the templates displayed in the template display area and automatically rearranges the images used on the page to be edited into the image layout regions of the different template thus selected.

The image display section displays, in the image editing area, the page to be edited on which the image editing section rearranged the images into the image layout regions of the different template for the user's confirmation.

By automatically performing from selection of a template to rearrangement of the images based on the user's instruction for rearrangement in this way, the user can significantly save his or her manual work to select a template and to rearrange the images.

In addition, when rearranging the images, the user may preferably specify an image the user desires to preferentially arrange (preferential image).

If the user specifies a preferential image for rearrangement of the images, the image editing section preferentially arranges the preferential image specified by the user when rearranging the images used on the page to be edited into the image layout regions of the different template.

Figure 20A:
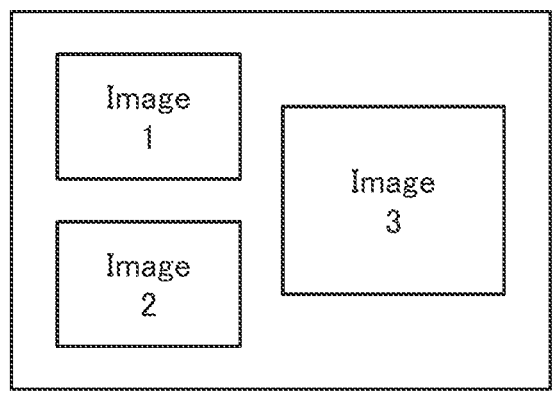
FIG. 20A is a conceptual diagram illustrating an example of the page to be edited before rearrangement.
Figure 20B:
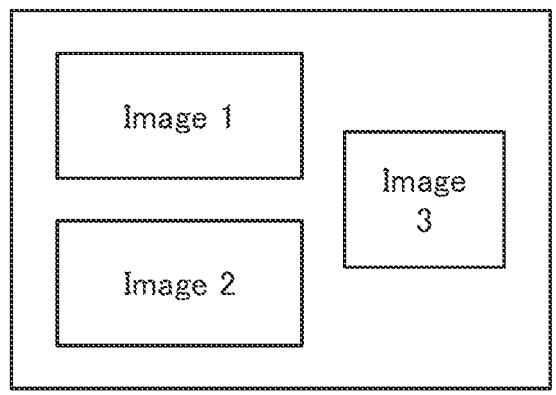
FIGS. 20B and 20C are conceptual diagrams each illustrating an example of the page to be edited after rearrangement.
Figure 20C:
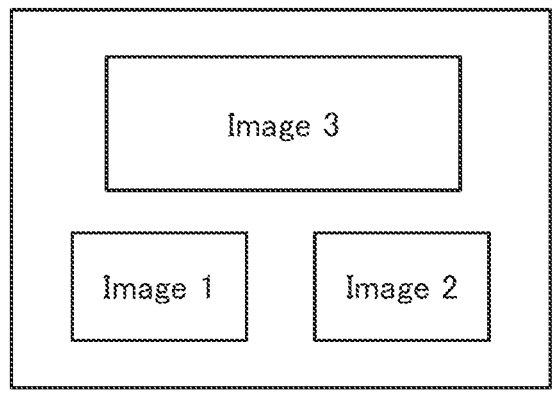

For example, an image 3 arranged in a large region before rearrangement as illustrated in FIG. 20A may possibly be arranged in a small region after rearrangement as illustrated in FIG. 20B if the layout is simply rearranged. By specifying the image 3 as a preferential image by the user, on the other hand, the image 3 will be arranged in a large region even after rearrangement as illustrated in FIG. 20C.

By allowing the user to specify a preferential image, the preferential image can be preferentially arranged even if the images are rearranged.

In this way, it is also possible to cause another image 1 which is arranged in a small region to be conversely arranged in a large region.

This invention is basically as described above.

While the image processing device, image processing method and image processing program of the invention have been described above in detail, the invention is not limited to the above embodiments and various improvements and modifications may be made without departing from the spirit and scope of the invention.

What is claimed is:

1. An image processing device for editing an image layout on each page of a photo-content commodity composed of a plurality of pages, the image processing device comprising:
    an image dividing section for dividing a plurality of images into a predetermined number of groups based on accessory information of the plurality of images;
    an image analyzing section for analyzing each of the plurality of images to generate image analysis information thereof;
    an image extracting section for extracting, for each group, a predetermined number of images from images included in each of the predetermined number of groups based on the image analysis information;
    an image arranging section for arranging, for each group, the predetermined number of images extracted by the image extracting section from each of the predetermined number of groups on a page corresponding to each of the predetermined number of groups;
    an image display section for displaying the page on which the predetermined number of images are arranged by the image arranging section; and
    an image editing section for editing, based on an instruction from a user, the image layout on the page on which the predetermined number of images are arranged by the image arranging section,
    wherein the image display section is adapted to display, in a display screen, an image editing area for displaying images arranged on a first page to be edited as specified by the user and a candidate image display area for displaying candidate images which are included in a first group corresponding to the first page and which are usable for editing the image layout by the image editing section, and
    wherein the image editing section is adapted to use the candidate images displayed in the candidate image display area to edit the image layout on the first page displayed in the image editing area based on the instruction from the user.

2. The image processing device according to claim 1, wherein the image display section is adapted to display only the candidate images included in the first group corresponding to the first page but not arranged on the first page in the candidate image display area.

3. The image processing device according to claim 1, wherein the image display section is adapted to display all images included in the first group corresponding to the first page in the candidate image display area in such a manner that images arranged on the first page are distinguished from images not arranged on the first page.

4. The image processing device according to claim 1, wherein the image display section is adapted to display the image analysis information in the candidate image display area.

5. The image processing device according to claim 1, wherein the image display section is adapted to attach to each of candidate images in all of the predetermined number of groups, identification information representing a group containing each of the candidate images and to display the candidate images for each group in the candidate image display area.

6. The image processing device according to claim 5, wherein the image display section is adapted to display the candidate images included in the first group corresponding to the first page in a first part of the candidate image display area.

7. The image processing device according to claim 1, wherein the image display section is adapted to further display, in the display screen, a template display area for displaying templates each having image layout regions for arranging images whose number is equal to or less than a number of images included in the first group corresponding to the first page, and
wherein the image arranging section is adapted to apply a first template specified by the user from the templates displayed in the template display area to the first page and to arrange images extracted by the image extracting section from the first group corresponding to the first page in image layout regions of the first template.

8. The image processing device according to claim 7, wherein the image editing section is adapted to acquire first candidate images of a number corresponding to a number of increased image layout regions based on the image analysis information from the candidate images included in the first group corresponding to the first page upon increase of a number of image layout regions as a result of a change from the first template to a second template, and
wherein the image arranging section adapted to apply the second template to the first page and to arrange the images extracted from the first group and the first candidate images in image layout regions of the second template.

9. The image processing device according to claim 7, wherein the image editing section is adapted to acquire first images of a number corresponding to a number of decreased image layout regions based on the image analysis information from the images arranged on the first page upon decrease of a number of image layout regions as a result of a change from the first template to a third template, and
wherein the image arranging section is adapted to apply the third template to the first page and to arrange images remaining after the first images are deleted from the images extracted from the first group in image layout regions of the third template.

10. The image processing device according to claim 2, wherein the image display section is adapted to display a first image addition button in the display screen, and
wherein, upon pressing of the first image addition button by the user, the image editing section is adapted to specify a second candidate image based on the image analysis information from the candidate images included in the first group corresponding to the first page and to add the second candidate image to the first page.

11. The image processing device according to claim 5, wherein the image display section is adapted to display a second image addition button in the display screen, and
wherein, upon pressing of the second image addition button after one or more candidate images are specified by the user from the candidate images displayed in the candidate image display area, the image editing section is adapted to add the one or more candidate images to a page corresponding to a group containing the one or more candidate images.

12. The image processing device according to claim 2, wherein the image display section is adapted to display an image replacement button in the display screen, and
wherein, upon pressing of the image replacement button after one or more images are specified by the user from the images displayed in the image editing area, the image editing section is adapted to specify third candidate images whose number is equal to a number of the one or more images based on the image analysis information from the candidate images included in the first group corresponding to the first page and to replace the one or more images by the third candidate images.

13. The image processing device according to claim 1, wherein the image arranging section is adapted to arrange the predetermined number of images extracted by the image extracting section from each of the predetermined number of groups on a page corresponding to each of the predetermined number of groups based on the image analysis information.

14. The image processing device according to claim 12, wherein the image arranging section is adapted to arrange the predetermined number of images extracted by the image extracting section from each of the predetermined number of groups to a page corresponding to each of the predetermined number of groups in order of an image shooting time and to further rearrange images displayed in the image editing area in order of the image shooting time after replacement of the one or more images by the third candidate images.

15. The image processing device according to claim 1, wherein, based on an instruction for rearrangement from the user, the image editing section is adapted to select a template different from the template used on the first page displayed in the image display section from among templates displayed in the template display area and arrange the images used on the first page into the image layout regions of the different template, and
the image display section is adapted to display the first page on which the images are rearranged into the image layout regions of the different template by the image editing section, in the image editing area.

16. The image processing device according to claim 15, wherein the image editing section is adapted to preferentially arrange an image specified by the user when arranging the images used on the first page into the image layout regions of the different template.

17. The image processing device according to claim 1, wherein the image analysis information is an evaluation value generated based on at least one of analysis results of image analysis items of each image.

18. The image processing device according to claim 1, wherein the image analysis information is analysis results of image analysis items of each image.

19. The image processing device according to claim 1, wherein the photo-content commodity is a photo book composed of a predetermined number of pages, a calendar composed of a predetermined number of pages, or a shuffle print composed of a predetermined number of pages, in the shuffled print, a predetermined number of images being randomly shuffled and printed on each page.

20. An image processing method for editing an image layout on each page of a photo-content commodity composed of a plurality of pages, the image processing method comprising:

an image dividing step of dividing a plurality of images into a predetermined number of groups based on accessory information of the plurality of images;

an image analyzing step of analyzing each of the plurality of images to generate image analysis information thereof;

an image extracting step of extracting, for each group, a predetermined number of images from images included in each of the predetermined number of groups based on the image analysis information;

image arranging step of arranging, for each group, the predetermined number of images extracted by the image extracting step from each of the predetermined number of groups on a page corresponding to each of the predetermined number of groups;

an image display step of displaying the page on which the predetermined number of images are arranged by the image arranging step; and an image editing step of editing, based on an instruction from a user, the image layout on the page on which the predetermined number of images are arranged by the image arranging step, wherein the image display step displays, in a display screen, an image editing area for displaying images arranged on a first page to be edited as specified by the user and a candidate image display area for displaying candidate images which are included in a first group corresponding to the first page and which are usable for editing the image layout in the image editing step, and wherein the image editing step uses the candidate images displayed in the candidate image display area to edit the image layout on the first page displayed in the image editing area based on the instruction from the user.

21. A non-transitory computer readable recording medium having recorded thereon a program for causing a computer to execute each step of the image processing method according to claim 20.

* * * * *